United States Patent [19]
Bard

[11] 3,907,370
[45] Sept. 23, 1975

[54] PLASTIC WHEEL CONSTRUCTION FOR UTILITY VEHICLES

[75] Inventor: Bernard D. Bard, Glencoe, Ill.

[73] Assignee: Creatron Industries, Inc., Winnetka, Ill.

[22] Filed: May 1, 1974

[21] Appl. No.: 465,870

[52] U.S. Cl. ............................ 301/63 R; 301/39 R
[51] Int. Cl.² ...................... B60C 7/24; B60B 5/00
[58] Field of Search......... 301/63 PW, 1, 122, 39 R, 301/63 R, 63 C, 65, 66

[56] References Cited
UNITED STATES PATENTS

| | | | |
|---|---|---|---|
| 2,878,074 | 3/1959 | Cawl | 301/63 PW |
| 3,604,756 | 9/1971 | Gruber | 301/63 PW |
| 3,807,474 | 4/1974 | Wendt | 301/63 PW |

*Primary Examiner*—M. Henson Wood, Jr.
*Assistant Examiner*—D. W. Keen
*Attorney, Agent, or Firm*—Hume, Clement, Brinks, Willian, Olds & Cook, Ltd.

[57] ABSTRACT

A vehicle wheel injection molded from plastic in one piece, including hub, web, rim and tire section. The tire section includes an outer rim which functions as a tread and is joined to the rim surrounding the web by a spaced series of radially extending fins disposed in planes perpendicular to the plane of the wheel. The web is serpentine in configuration. Decorative inserts are mounted on one side of the tire section in one form of the wheel.

6 Claims, 7 Drawing Figures

PLASTIC WHEEL CONSTRUCTION FOR UTILITY VEHICLES

FIELD OF THE INVENTION

This invention is in the field of vehicle wheels. It relates particularly to small wheels for utility vehicles and the like, including but not limited to lawnmowers, seed spreaders, carts and merchandise carriers or the like.

BACKGROUND OF THE INVENTION

Utility vehicle wheels have traditionally been made from stamped metal parts provided with resilient tires. More recently, the use of molded plastic wheels with some form of resilient tire and a suitable bearing have become relatively popular. An example of the latter is disclosed in the Gruber U.S. Pat. No. 3,604,756. As Gruber points out, however, the use of plastic wheels has been limited. Plastic wheel constructions heretofore developed have either been relatively expensive or possessed of insufficient compressive strength to make them practical. Where the annular tire portion of the wheel is molded unitarily with the web from plastic, the service life of the wheels has been relatively short and inadequate.

SUMMARY OF THE INVENTION

An object of the present invention is to provide an improved plastic vehicle wheel for utility vehicles and the like. Another object is to provide a plastic vehicle wheel wherein the hub, web, rim and tire section are injection molded in a single, unitary structure. It is still another object to provide such a plastic vehicle wheel wherein the rim and tire of the wheel, formed integrally, provide a resiliency which substantially obviates shortcomings of known prior art plastic wheels insofar as compressive strength and shock loading is concerned. Another object is to provide a plastic wheel construction which is inordinately tough and long-lived. Yet another object is to provide an improved web construction for a plastic vehicle wheel providing visual and structural uniformity and integrity. A further object is to provide a wheel in which one form of the wheel has an annular ring covering one side of the tire section, this annular ring being grooved in a concentric series of slots to selectively receive decorative insert members.

The foregoing and other objects are realized in accord with the invention by providing an injection molded, plastic wheel formed with the hub, web, rim and tire section molded in one piece. The tire section is formed around the rim which encircles the web. This rim is hereinafter referred to as the inner rim. An outer rim of the tire section defines the tire tread on the wheel. The rims are interconnected by an annularly spaced series of radially extending fins. The fins are closely spaced circumferentially and extend in planes perpendicular to the plane of the wheel. The web of the wheel; i.e., the central portion connecting the hub with the inner rim, is unitarily formed in a serpentine, cross-sectional configuration whereby it presents an identical appearance and structural arrangement from both sides of the wheel.

In a first form of the invention, the hub of the wheel is formed to receive a steel bearing insert. The bearing insert is keyed for locking engagement in the hub. The insert is, in turn, keyed for receipt of an axial shaft, and the shaft is locked in the hub and turns with the wheel.

In this form of the wheel, an annular ring interconnects the inner and outer rims on one side of the wheel. This annular ring is grooved in a concentric series of annular grooves on its outer surface. Locking lips are formed in at least one of these grooves and a circular insert member is inserted in the groove to provide desired decoration and/or identification by color. In this regard, the hub opposite the insert sleeve is covered by a colored plastic hub-cap normally coordinated with the color of the insert member.

In a second form of the invention, the annular ring of one side of the fins is eliminated. This wheel form is identical in all respects when viewed from both sides. It is preferably employed for "center" wheel applications where uniformity of sides is desired.

BRIEF DESCRIPTION OF THE DRAWINGS

The invention, including its construction and method of operation, together with additional objects and advantages thereof, is illustrated more or less diagrammatically in the drawing, in which.

DESCRIPTION OF THE PREFERRED EMBODIMENTS

Figure 1:
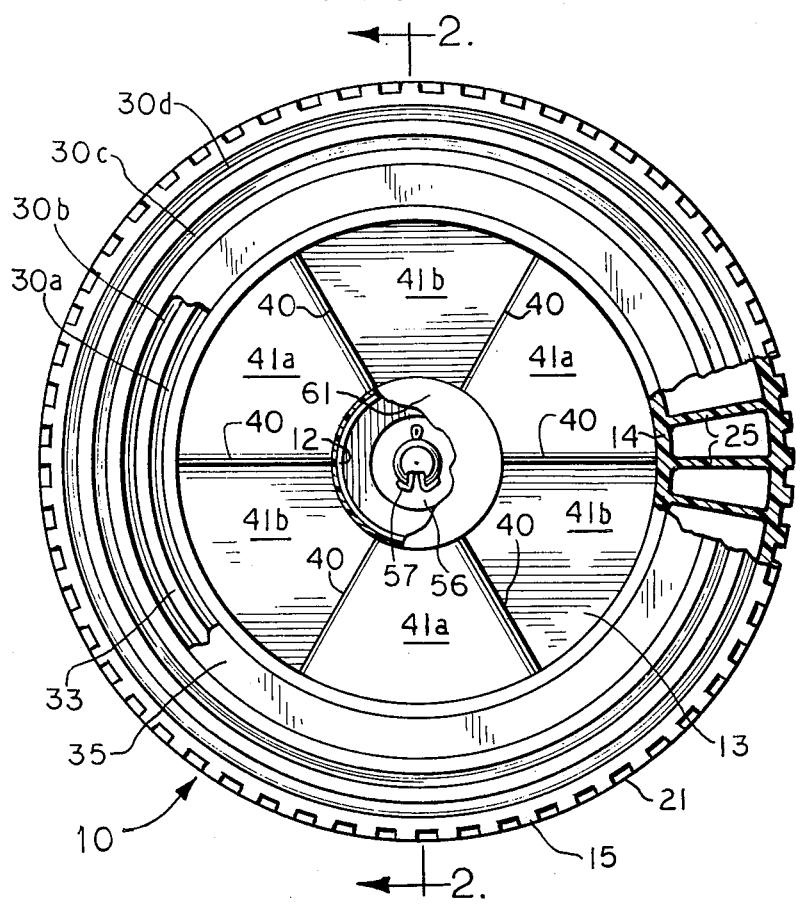
FIG. 1 is a front elevational view of a molded plastic vehicle wheel embodying features of a first form of the present invention, with parts broken away.

Referring now to the drawings, and particularly to FIGS. 1–4, a plastic vehicle wheel embodying features of a first form of the present invention is illustrated generally at 10. The wheel 10, which is mounted for rotation with an axel shaft 11, includes a hub 12, a web 13, a rim 14, and a tire section 15, all integrally formed of plastic by known injection molding techniques.

The annular inner rim 14 is formed around the web 13. The tire section 15 encircles the rim 14 and itself includes an annular outer rim 21 which forms the tire tread of the wheel. The inner rim 14 and the outer rim 21 are, according to the invention, interconnected by an annular spaced series of radially extending fins 25 disposed perpendicular to the plane of the wheel 10.

Figure 3:
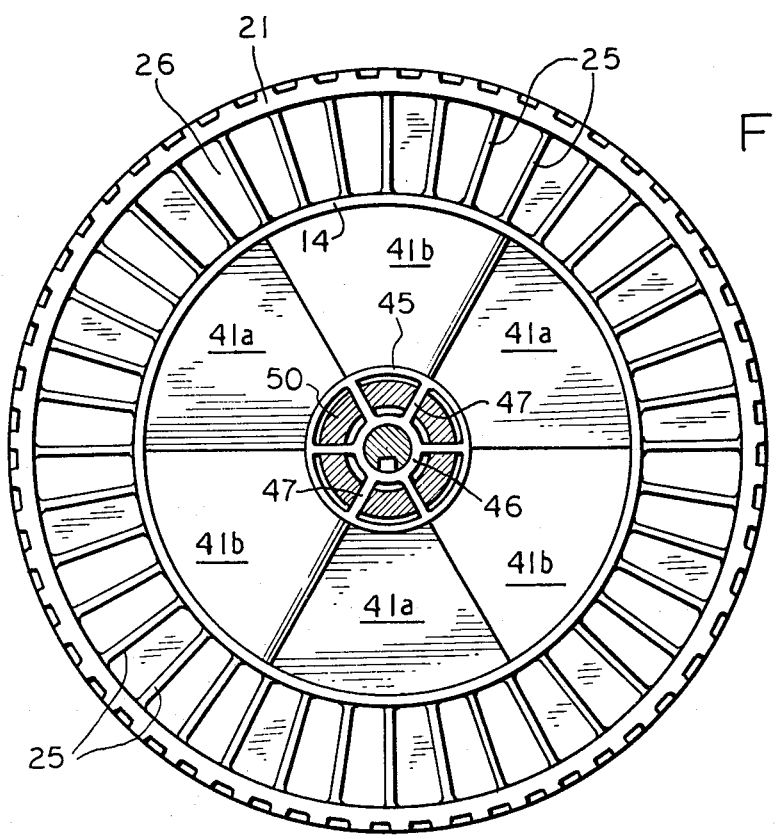
FIG. 3 is a view taken along line 3—3 of FIG. 2.

Looking at the wheel 10 from its inner side, as illustrated in FIG. 3, the radially extending fins 25 present a honeycomb effect. They extend a substantial portion of the transverse dimension or thickness of the wheel 10. At the opposite or outer side of the wheel 10 these fins 25 terminate in an annular ring 26 which interconnects both the fins 25 and the inner and outer rims 14 and 21, lying in a plane parallel to the plane of the wheel itself.

The annular ring 26 has a series of concentric circular grooves 30a, 30b, 30c and 30d formed in its outer surface. In the present illustration, the innermost of these grooves, 30a, has an undercut lip 32 formed around its inner surface. Furthermore, the grooves 30a and 30b have a relatively short annular wall 33 separating them.

The import of the aforedescribed slot 30a construction is that a circular decorative insert 35 may be snapped into place in the innermost groove 30a. The decorative insert 35 has an annular lip 36 formed on its inner periphery and this annular lip resiliently snaps under the annular shoulder 32 in the groove 30a, locking the circular insert in place. The insert 35 might be colored in any suitable manner to provide a decorative and identifying feature on the wheel 10. Others of the annular grooves 30b–30d could also be modified in like manner to receive such circular decorative inserts.

As has been pointed out, the cylindrical hub 12 of the wheel 10 is connected to the rim 14 by a web 13. According to the present invention, the web 13 is a continuous circular plastic segment molded in serpentine, cross-sectional configuration so as to present an identical appearance from both sides of the wheel, as seen in FIGS. 1 and 3. In effect, a radially extending series of six web segments 40 extending parallel to the fins 25, are interconnected, in alternating fashion, at their opposite edges by flat web segments 41a and 41b, the web segments 41a being substantially coplanar on one side of the center line of the wheel and the web segments 41b being substantially coplanar on the opposite side of the center line of the wheel, as seen in FIG. 2.

Figure 4:
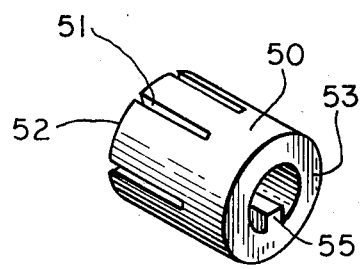
FIG. 4 is a perspective view of a bearing insert sleeve utilized with the wheel seen in FIGS. 1–3.

The hub 12 of the wheel 10 includes an outer sleeve 45 connected to an inner sleeve 46 by a radially extending series of spokes 47. Referring to FIG. 4, a steel bearing insert 50 has a corresponding series of radial slots 51 formed outwardly from its inner surface 52 to a point short of the outer surface 53 of the sleeve.

Figure 2:
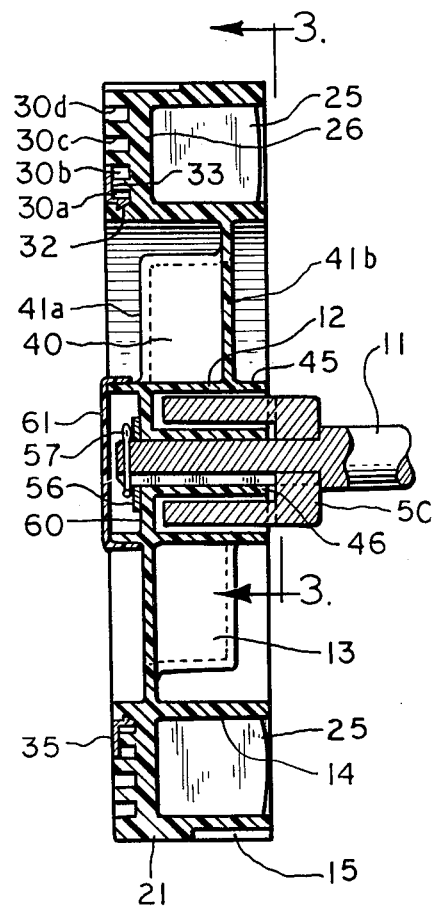
FIG. 2 is a sectional view taken along line 2—2 of FIG. 3.

As seen in FIGS. 2 and 3, the insert 50 is inserted into the hub 12 from one side of the hub 12, with the radial spokes 47 entering corresponding ones of the radial slots 51 in the sleeve. Fully inserted, the insert 50 appears as illustrated in FIG. 2. An axel shaft 11, keyed through the insert 50 and to it by the internal key 55, is retained on the wheel 10 with the insert by a bearing washer 56 and cotter key 57 on the free end of the shaft and bearing against the outer wall 60 of the hub 12.

The wheel 10 which has been described is designed to be orientated with its decorative ring insert 35 facing outwardly on a vehicle, as will be recognized. To this end, the hub 12 is provided with an annular cap 61 overlying the cotter key 57 end of the axial shaft 11 extending through the hub.

By virtue of its unique radial fin 26 and rims 14, 21 construction, a usually high compressive stress resistant factor is built into the wheel 10. The wheel 10 takes shock loads very well, and has a much longer service life than hereinbefore thought possible in one piece, molded plastic wheels. The serpentine configuration of the web 13 affords complete uniformity of support of the inner rim 14 from the hub 12 as well as uniform load bearing characteristics.

Figure 5:
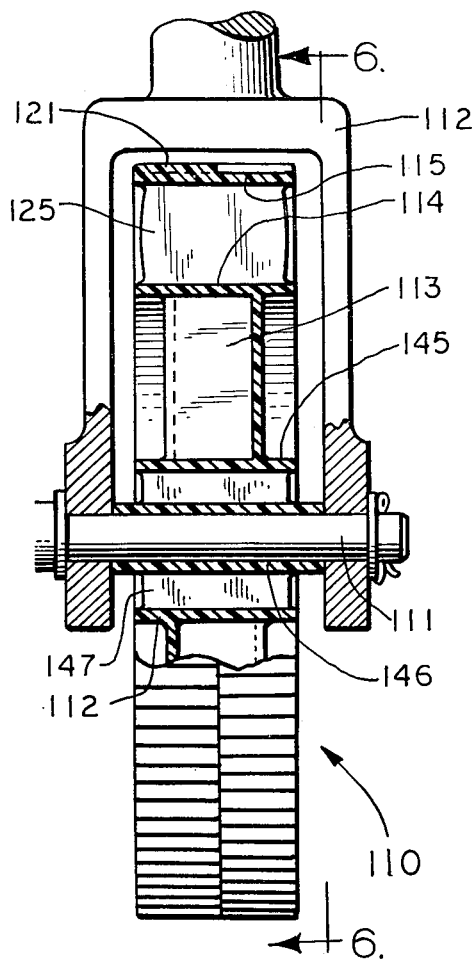
FIG. 5 is a front elevational view, with parts broken away in section, of a molded plastic vehicle wheel embodying features of a second form of the invention.
Figure 6:
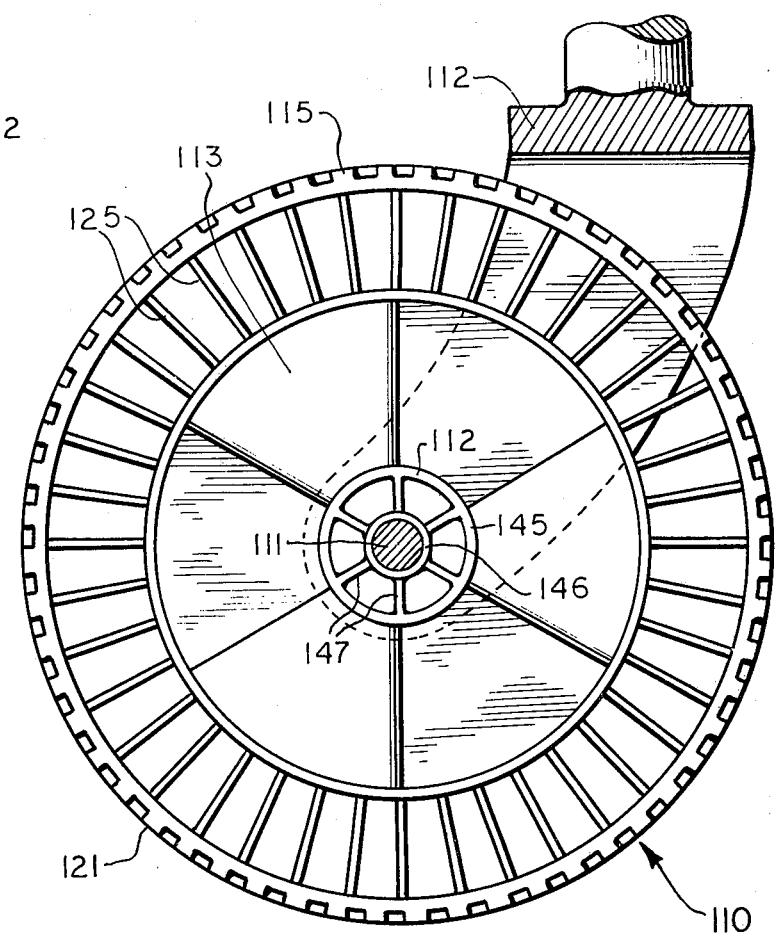
FIG. 6 is a view taken along line 6—6 of FIG. 5.
Figure 7:
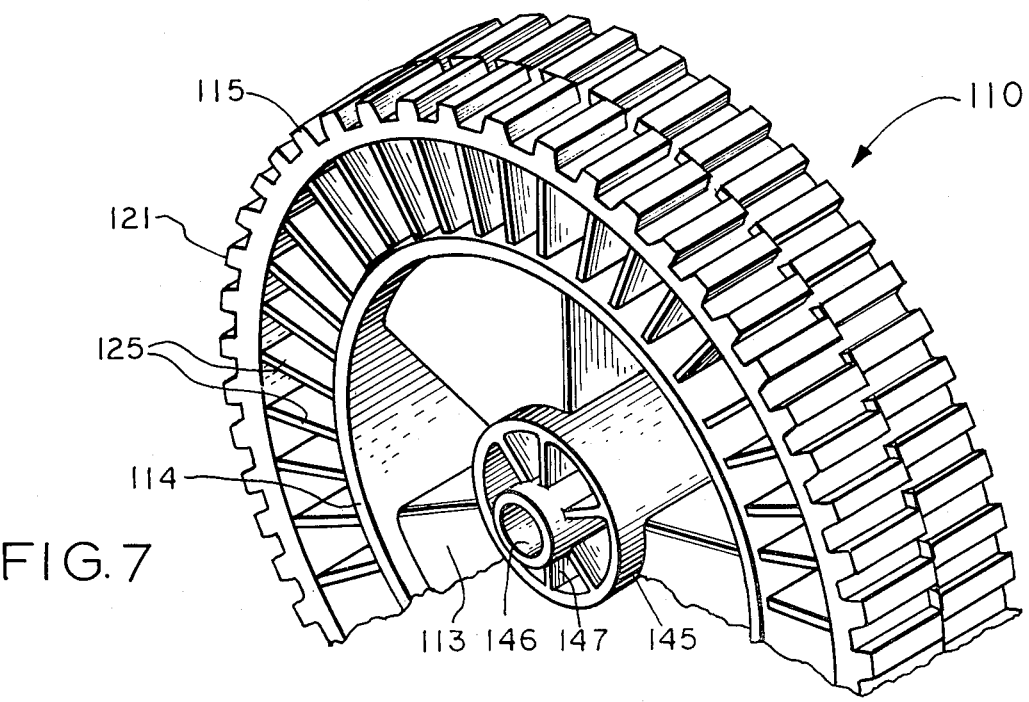
FIG. 7 is a perspective view, with parts broken away, of the second form of vehicle wheel illustrated in FIGS. 5 and 6.

Turning now to a second form of the invention, where it is desirable that a wheel have an identical appearance from either side; i.e., when it is being used as a single caster wheel, for example, the wheel 110 seen in FIGS. 5–7 may be utilized. The wheel 110 is identical in configuration when viewed from either side and is adapted to rotate on a stub axel 111 mounted in a caster yoke 112 of conventional configuration. The stub axel 111 extends through the hub 112 of the wheel 110.

In the wheel 110, the hub 112 is connected by the web 113 and the inner rim 114 with an annular tire section 115 in a manner identical to the construction of the wheel 10 hereinbefore described. The tire section 115 surrounds the inner rim 115 and has an outer rim 121 which functions as a wheel tread. Radially extending fins 125 join the two rims 114 and 121. The radially extending fins 125 are arranged substantially identical to the fins 25 hereinbefore discussed. Unlike the wheel 10, however, in the wheel 110 the annular ring 26 is eliminated and the tire section 115 is, in effect, open when viewed in side elevation as in FIG. 6.

The hub 112 comprises outer and inner sleeves 145 and 146, respectively, interconnected by radially extending fins 147, all molded of plastic. The stub axel extends through the inner sleeve 146 in support of the wheel 110. Like the tire section 114, the hub section 112 is identical in construction when viewed from either side of the wheel.

The wheel 110 provides all the structural advantages provided by the wheel 10 hereinbefore discussed. Substantial compression and impact strength, affording relatively long service life, is achieved.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A vehicle wheel, comprising:
   a. hub means,
   b. web means formed unitarily with and extending radially from said hub means to an annular inner rim, and
   c. a tire section encircling said annular inner rim and formed unitarily therewith,
   d. said tire section including a series of annularly spaced fins extending radially of the wheel's axis and lying in planes generally perpendicular to the plane of the wheel,
   e. said tire section including an annular outer rim connected to said annular inner rim by said series of fins,
   f. said annular outer rim defining a tread for said wheel.

2. The vehicle wheel of claim 1 further characterized in that:
   a. said hub means, web means, annular inner rim and tire section are molded in one piece from a plastic material.

3. The vehicle wheel of claim 1 further characterized in that:
   a. said web means has a serpentine configuration in annular cross-section whereby the web means has a similar structure and design as viewed from both sides of the wheel.

4. The vehicle wheel of claim 1 further characterized by and including:
   a. an annular ring on one side of said wheel interconnecting corresponding edges of each of said fins.

5. The vehicle wheel of claim 4 further characterized in that:

a. said annular ring has at least one annular groove formed in its outer surface,
b. a removable insert mounted in said groove, and
c. means releasably locking said insert in said groove.

6. The vehicle wheel of claim 5 further characterized in that:

a. a plurality of concentric grooves are formed in said annular rim.

* * * * *